United States Patent [19]
Gowing

[11] Patent Number: 5,115,594
[45] Date of Patent: May 26, 1992

[54] TREBLE HOOK

[75] Inventor: Jim Gowing, Altus, Ark.

[73] Assignee: EBSCO Industries, Inc., East Leeds, Ala.

[21] Appl. No.: 701,054

[22] Filed: May 16, 1991

[51] Int. Cl.$^5$ ............................................. A01K 83/00
[52] U.S. Cl. .................................................. 43/44.82
[58] Field of Search ...................... 43/44.82, 43.16, 34, 43/36

[56] References Cited

U.S. PATENT DOCUMENTS

| | | | |
|---|---|---|---|
| 842,594 | 1/1907 | Van Vleck | 43/43.16 |
| 1,283,718 | 11/1918 | Ford | 43/44.82 |
| 2,379,886 | 7/1945 | De Witt et al. | 29/9 |
| 2,490,583 | 12/1949 | Dunkelberger | 43/44.82 |
| 2,608,791 | 9/1952 | Wentz | 43/43.16 |
| 4,060,928 | 12/1977 | Messler et al. | 43/43.16 |
| 4,283,877 | 8/1981 | Onstott et al. | 43/34 |
| 4,905,402 | 3/1990 | Clark | 43/43.16 |
| 4,965,957 | 10/1990 | Hnizdor | 43/44.82 |

Primary Examiner—Richard K. Seidel
Assistant Examiner—Jeanne M. Elpel
Attorney, Agent, or Firm—Lane, Dougherty, Hessin & Beavers

[57] ABSTRACT

A treble fishing hook includes an elongated shank which has a first end and a second end. An eye is secured to the first end of the shank. three barb-carrying bight portions are secured to the second end of the shank with the three bight portions being equally spaced about the axis of the shank and separated by an angle of about 120°. Each of the bight portions is bent outwardly from the shank so as to lie in a plane which extends at an angle of from about 14° to about 20° to the axis of the shank. A barb is carried on each of the bight portions, and each barb is angularly displaced out of the plane of the bight portion.

1 Claim, 1 Drawing Sheet 5,115,594

TREBLE HOOK

FIELD OF THE INVENTION

This invention relates to an improved treble barb fishing hook

BACKGROUND OF THE INVENTION

1. Brief Description Of The Prior Art

Various types of fishing hooks have previously been devised which are thought to yield improved results in retention capability for preventing fish from "throwing" the hook after initial contact and impalement thereby.

U.S. Pat. No. 2,379,886 depicts a fish hook which has the hook portion bent laterally or curved.

Dunkelburger U.S. Pat. No. 2,490,583 is a composite three-barb fish hook. Each barb is deflected from the plane of the stamping from which the hook is made so that the fish hook assembly has a spiral-like twist to the three hooks.

2. Brief Description of the Preferred Embodiment

This invention provides a treble-barb fishing hook which, by reason of its geometric configuration, has enhanced retention capability to prevent a fish which has struck the bait and become impaled on the hook from disengaging the hook. Further, and importantly, as the fish attempts to spit out or throw the hook, the hook actually becomes more firmly and deeply impaled in the jaw of the fish so that fewer fish are lost when the hook of the present invention is used in fishing Broadly described, the fishing hook of the present invention comprises a treble hook having three barbs which are symmetrically arranged and equidistantly spaced about the axis of a single shank portion to which each of the three barbs is connected by an intervening bight portion. Each of the bight portions of the hook is bent outwardly from the shank so as to lie in a plane which extends at an angle of from about 14° to about 22° to the axis of the shank. The barb carried on the opposite end of each bight portion from the end of the bight portion connected to the shank is angularly displaced from the plane in which the bight portion lies so as to be disposed in a plane which projects at an angle of from about 14° to about 22° to the plane of the bight portion.

As the fish which has struck the bait and has been impaled by the barb pulls on the hook or attempts to spit out the hook, the point penetrates at the angle of the canting or displacement of the barbs, and each time the fish pulls on the hook or tries to dislodge it by running or jumping, the points of the hook spiral, and thus the fish has, in almost all cases, two, and sometimes all three, barbs impaled in him.

An important object of the present invention is to provide an improved treble hook which has greater retention capability for retaining a fish which has struck the hook and become impaled on at least one of the barbs thereof. Another object of the invention is to substantially increase the ratio of catches per strike by the use of an improved treble hook by an angler while fishing.

GENERAL DESCRIPTION OF THE DRAWINGS

DETAILED DESCRIPTION OF A PREFERRED EMBODIMENT OF THE INVENTION

Figure 1:
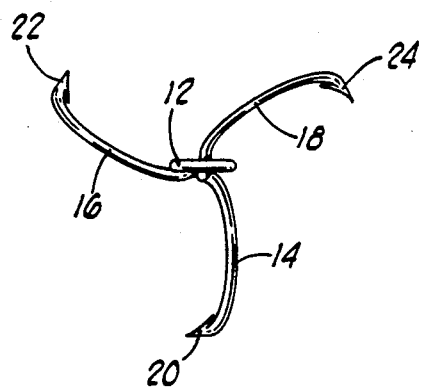
FIG. 1 is a top plan view of a treble hook constructed in accordance with the present invention.

The treble hook of the invention includes a conventional elongated shank portion 10 which has a first end and a second end. The first end of the shank 10 carries a suitable eye 12 to which a flexible retrieving line (not shown) can be attached in conventional fashion. In most treble hooks, the shank portion 10 actually has three straight parts secured together as shown so that the longitudinal axes of the three parts are parallel.

As is conventional with treble hooks, the hook carries three barbs at the outer ends of curved bight portions which are attached to the three parts of the shank portion 10 and support the barbs at properly spaced intervals. In the illustrated embodiment of the present invention, there are three bight portions 14, 16 and 18 which are arcuate or curved portions of rigid wire or the like. Each of the bight portions has one end connected to one of the parts of the shank 10 and carries a sharp barb or point at its other or free end. Thus, the bight portion 14 carries a barb 20 at its outer end. Similarly, the bight portion 16 carries a barb 22 at its outer end and the bight portion 18 carries a barb 24 at its outer end.

Figure 2:
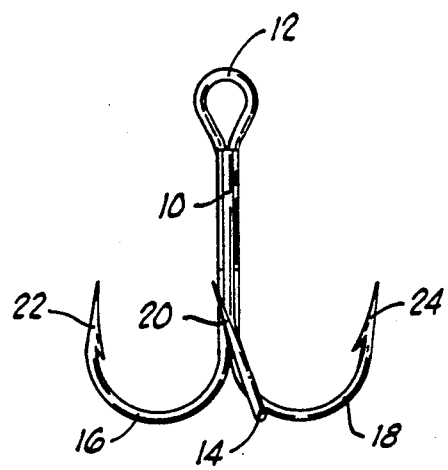
FIG. 2 is a side elevation view of the treble hook shown in FIG. 1.
Figure 3:
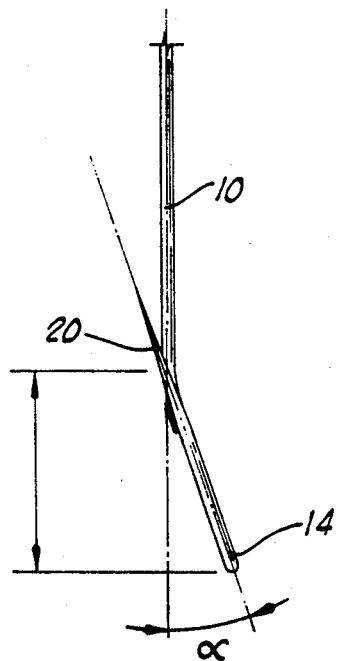
FIG. 3 is an enlarged side elevation view of the treble hook shown in FIGS. 1 and 2, but having two of the barbs and their respective bight portions removed in order to show the angular inclination of each of the bite portions with respect to the axis of the shank of the hook.
Figure 4:
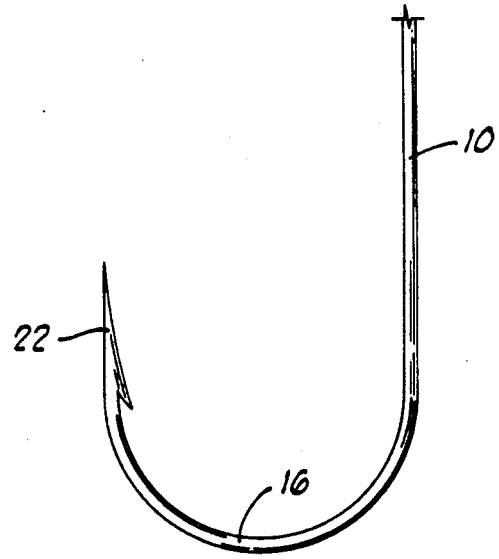
FIG. 4 is an enlarged side elevation view of one barb and bight portion of the hook after the hook shank, bight portion and barb has been rotated through 90° from the position thereof depicted in FIG. 3.

The bight portions 14, 16 and 18 are angularly spaced about the axis of the shank 10, so that each pair of bight portions defines an angle of about 120° therebetween. Each of the bight portions is bent out of a plane containing the shank 10 so as to lie in a plane which extends at an angle of from about 14° to about 22° to the longitudinal axis of the elongated shank. This relationship is best illustrated in FIGS. 2 and 3. In FIG. 3, the angle at which the axis of the shank extends to the plane which contains the bight portion 14 is designated alpha, α, and is preferably about 18°.

Figure 5:
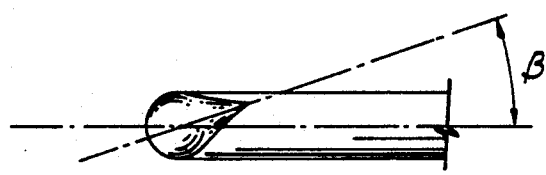
FIG. 5 is an enlarged view of the barb carried at the tip end of each bight portion of the hook, and showing the way in which the barb is twisted out of the principal plane of the bight portion of the hook so as to be offset laterally therefrom.

In referring to FIG. 5, it will also be noted that each barb carried on the free outer end of each bight portion is bent laterally or oriented to lie in a plane which extends at an angle, β, of from about 14° to about 25° with respect to the principal plane in which curved bight portion which carries it lies. The preferred offset or angulation is about 20°. Thus, both the barb and its respective bight portion are disposed in offset planes which are angled with respect to each other, and the plane of the bight portion is angled with respect to the plane in which the longitudinal axis of the shank lies.

The angular inclination of the bight portions in their connection to the shaft, and of the barbs relative to the planes of the bights, causes the hook to undergo a spiraling movement as one of the barbs is touched by the fish. Stated differently, the hook barbs or points, in being canted at the described angle with respect to the plane containing the bight portion, cause the treble hook to undergo rotation upon penetration of the mouth of the fish.

The fact that the hook points or barbs are penetrating along spiral or twisting paths makes it more difficult for the hook to be shaken out or thrown free by the fish.

Although a preferred embodiment of the invention has been herein illustrated and described, the structure of such preferred embodiment may be slightly altered without departure from the basic principles of the invention. Such changes can be effected while remaining within the basic principles of the invention, and are therefore intended to be encompassed within the range of equivalents of the appended claims.

What is claimed is:

1. A treble fishing hook comprising:

an elongated shank having a first end and a second end;

an eye secured to the first end of the shank; and three barb-carrying bight portions secured to the second end of the shank, said bight portions being equally spaced from each other about the axis of the shank, and each lying in a plane which extends at an angle of from 14° to 22° to the axis of the shank; and a barb carried on each of said bight portions and angularly displaced from the plane in which the bight portion lies so as to be disposed in a plane which projects at an angle of from 12° to 22° with respect to the plane of the bight portion.

* * * * *